United States Patent [19]

Lajara et al.

[11] Patent Number: 5,722,748
[45] Date of Patent: Mar. 3, 1998

[54] COMPUTER ENCLOSURE HAVING SIDE OPENING FOR REMOVABLE MEDIA

[75] Inventors: Robert Lajara, San Jose; Clifford Willis, Tracy; Alan Lee Winick, San Jose, all of Calif.

[73] Assignee: Sun Microsystems, Inc., Mountain View, Calif.

[21] Appl. No.: 671,311

[22] Filed: Jul. 1, 1996

[51] Int. Cl.[6] .................................................. A47B 47/00
[52] U.S. Cl. .................................... 312/265.6; 312/223.2; 220/449
[58] Field of Search ........................ 312/257.1, 223.2, 312/291, 265.6, 293.3, 213, 263, 265.5, 204; 220/449, 461, 465

[56] References Cited

U.S. PATENT DOCUMENTS

| | | | |
|---|---|---|---|
| 1,406,478 | 2/1922 | Mote | 220/449 |
| 5,211,305 | 5/1993 | Horton | 220/461 |

*Primary Examiner*—Peter M. Cuomo
*Assistant Examiner*—Gerald A. Anderson
*Attorney, Agent, or Firm*—Julian Caplan; Flehr Hohbach Test Albritton & Herbert LLP

[57] ABSTRACT

A cover for a rectangular enclosure is pivoted to the rectangular base at the front, swings rearwardly-downwardly and engages the back of the base. A CD drive installed in the base is accessible from one side. For the purpose of inserting CDs and providing access for CD controls and jacks, a base window is formed in the side of the base and its edges are framed with a bezel which projects slightly outward from the base side. The cover has a cover window in one side congruent to the base window but spaced outward so that, as the cover is swung closed, the cover window is displaced outwardly relative to the bezel and the bezel does not interfere with closing the cover.

5 Claims, 4 Drawing Sheets

COMPUTER ENCLOSURE HAVING SIDE OPENING FOR REMOVABLE MEDIA

BACKGROUND OF THE INVENTION

1. Field of the Invention

This invention relates to a new and improved computer enclosure having a side opening for removable media, such as a CD drive, tape, PCMIA card or the like. More particularly, the invention relates to a clamshell type enclosure wherein the cover pivots at the front and is swung downwardly rearwardly to engage the base. The side opening in a side panel which extends up from the base is framed with a bezel and the cover is outwardly displaced adjacent the bezel so that the bezel does not interfere with closing the cover.

2. Description of Related Art

Most access openings for CDs and the like are located in the front of the enclosure. Because the mechanics of assembling and disassembling the top or cover and the base, the parting line of the access opening to the case at the front creates no problem. The CD may be flush with the face of the enclosure. However, the placement of the access opening in the front is cosmetically inferior to side placement.

There are other side access openings in commercially available computer enclosures. However, in some of these products, there are only covers on two sides rather than four sides, as in the present invention. In other side opening products, only floppy disks are inserted and the problems involved in such products are much less complex than where CDs are installed because CDs usually require controls and jacks which must come out of the side. Hence providing a bezel which accomodates such controls and jacks interferes with closing of the cover.

SUMMARY OF THE INVENTION

A computer enclosure has a base and a cover. The cover closes in a clamshell fashion in that it is pivoted from the bottom edge of the front rearwardly downwardly and its rear end engages the rear of the base. On one side an opening is formed in the base for a slit through which CDs or other accessories may be inserted and removed and a larger opening for controls and jacks. The openings in the side panel are framed with a bezel in accordance with the present invention. The bezel projects out beyond the boundary of the side, a distance of approximately 3 millimeters. Buttons and controls may project out further than the bezel. To prevent interference of the projecting bezel with closing of the cover, the cover is flexible and the area of the cover which overlies the bezel is displaced or distorted outwardly. After the cover is closed, the cover returns to its original shape and the bezel lines the edge of an opening in the cover designed for such purpose.

BRIEF DESCRIPTION OF THE DRAWINGS

The accompanying drawings, which are incorporated in and form a part of this specification, illustrate embodiments of the invention and, together with the description serve to explain the principles of the invention.

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
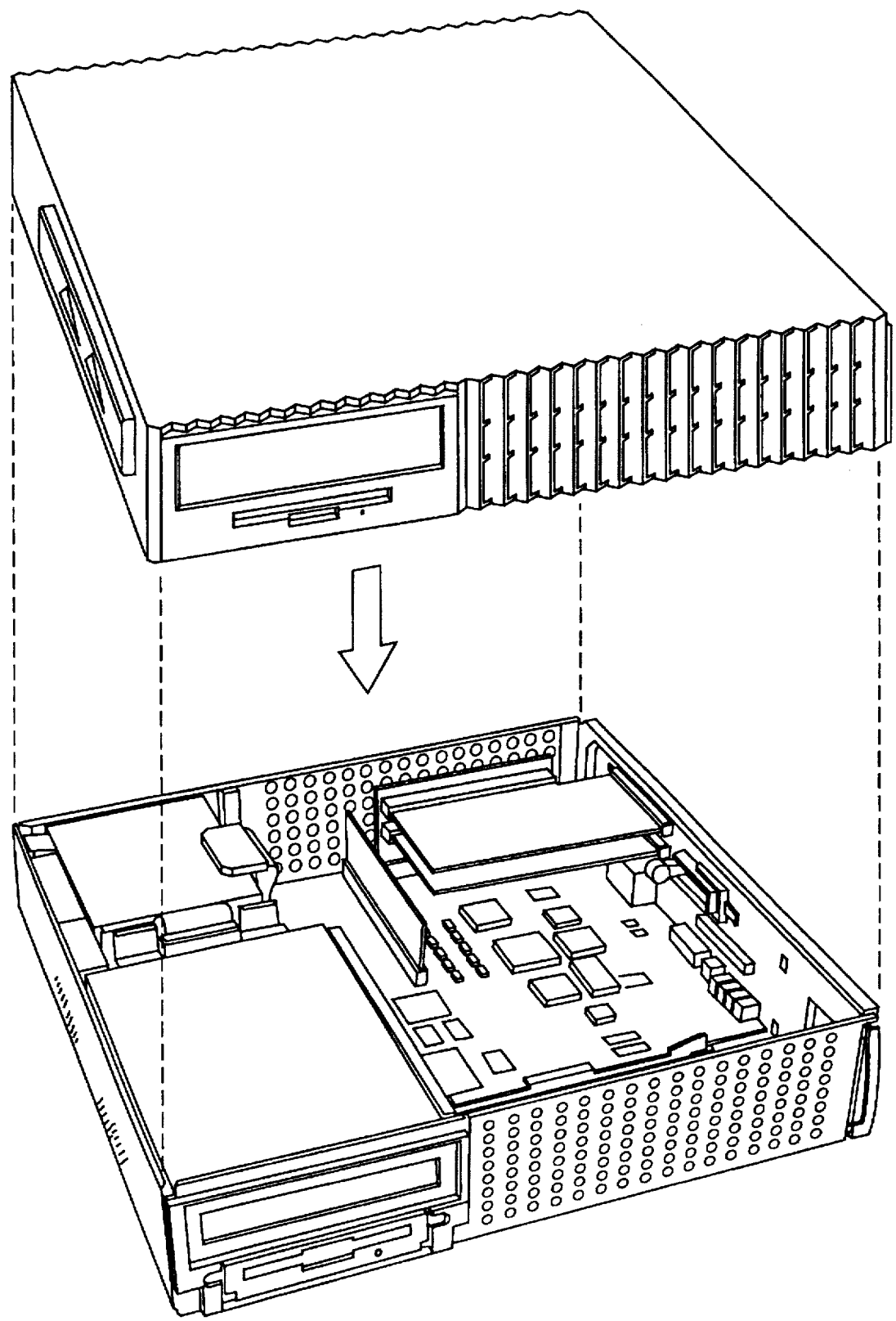
FIG. 1 is an exploded perspective view of a computer enclosure and cover.

The enclosure of the present invention employs a base 21 having a bottom 22 and vertically upstanding front 23, rear back end 24, side 26 panel and opposite side 27. Side panels 26 and 27 are formed with vents. Mounted within the base 21 are various electronic components shown in FIG. 1. These are, of course, merely representive. One such component is CD drive 25. On either side of rear 24 is a curved vertical guide 28 which curves downwardly rearwardly.

Cover 31 has a top 32, front end 33, rear flanges 34 to engage guide 28, side 36 and opposite side 37. Side 36 is formed with corrugations 38 for cosmetic purposes and also to provide unobtrusive ventilation holes. Side 36 is flexible in the sense that it may distort outwardly from a plane.

Figure 6:
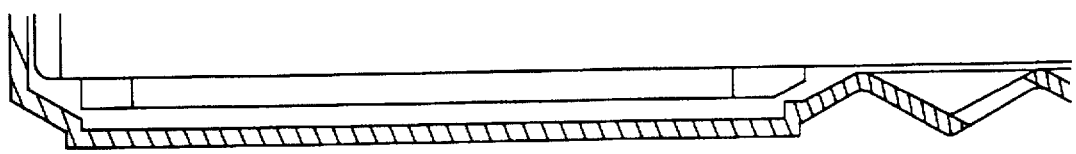
FIG. 6 is an enlarged fragmentary sectional view taken substantially along the line 6—6 of FIG. 4.

An irregular shaped window (not shown) is formed in side 26 adjacent the forward end thereof. A bezel 42 frames the window and bezel 42 is formed with a horizontal slit opening 43 for inserting and removing a CD or another accessory and a larger second bezel opening 43 for controls and jacks. As best shown in FIG. 6, bezel has an outward projection 46 from the plane of the remainder of side 26 a distance of approximately 3 millimeters. Buttons and controls not shown may project further than projection 46 for a total protrusion of about 5 millimeters.

As also best shown in FIG. 6, a portion 49 of side 36 contacts the upper edge of bezel 42 and is outwardly distorted beyond the extension of projection 46. Therefore, as the cover 31 is pivoted from the front edge downwardly rearwardly, (see FIGS. 2 and 3) the outward distorted portion 49 clears the bezel 42 and then snaps back to original shape. Bezel 42 frames side opening 51 which is congruent with the opening 43 and another opening 52 which is congruent with the opening 44.

Figure 2:
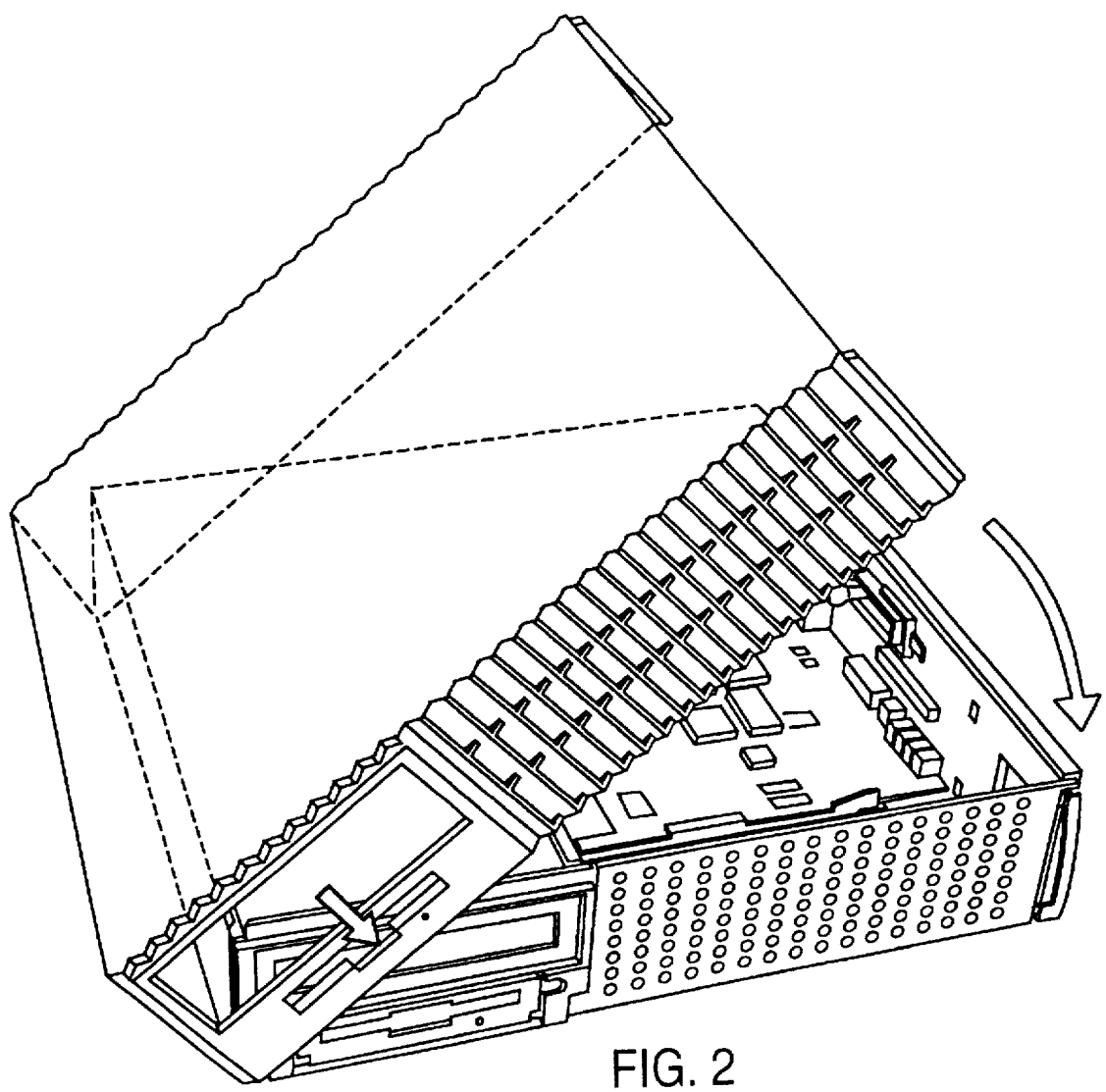
FIG. 2 is a schematic perspective view showing beginning of the closing of the cover.
Figure 3:
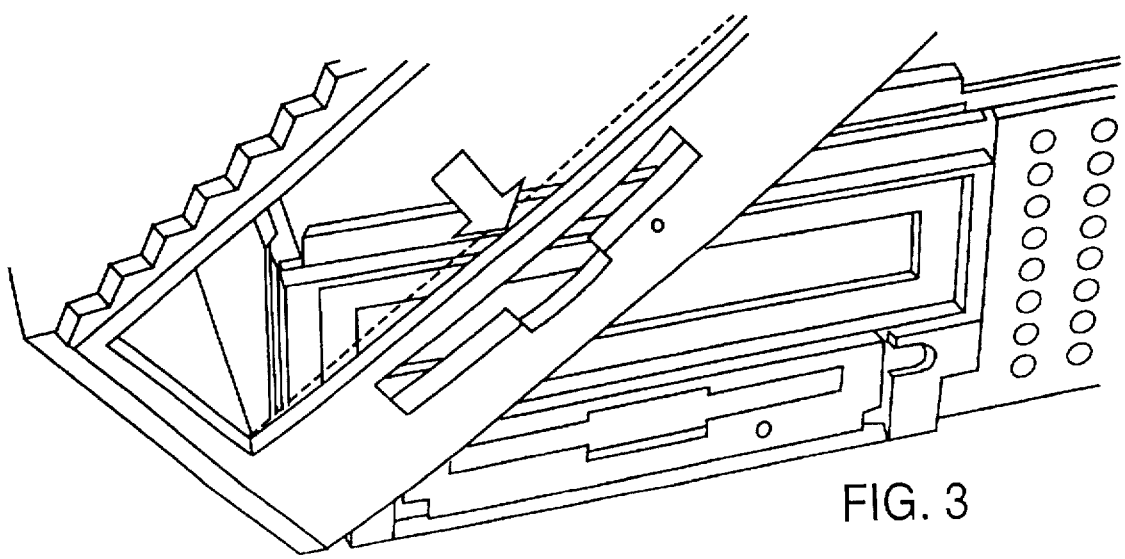
FIG. 3 is an enlarged view of portions of the structure of FIG. 2.
Figure 4:
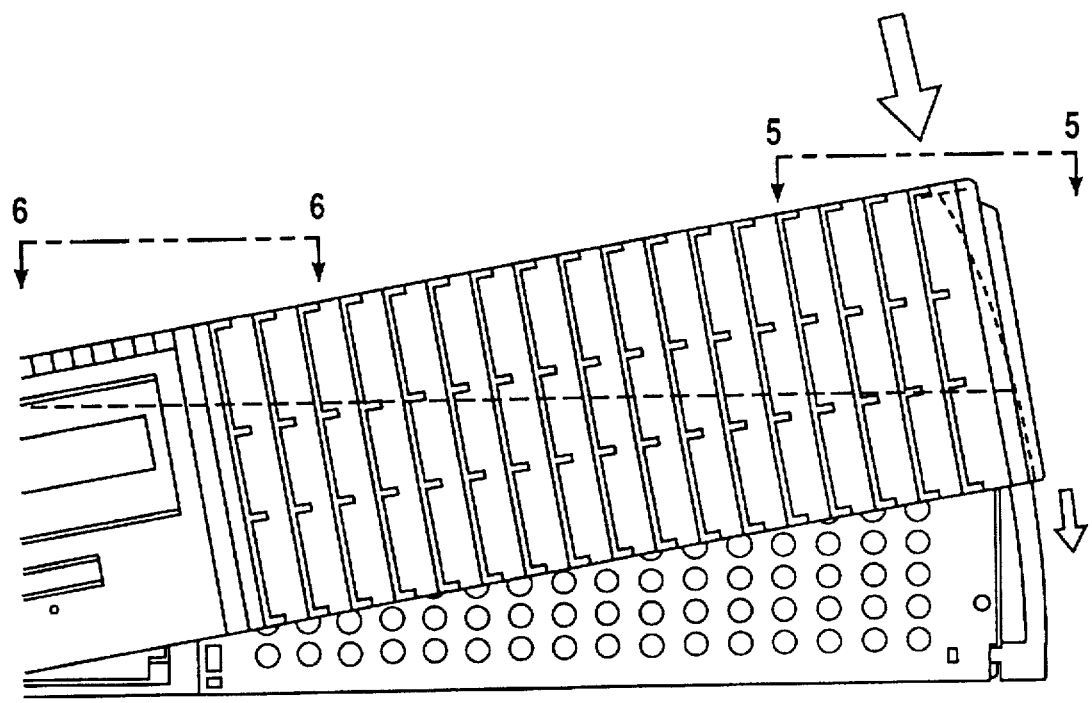
FIG. 4 is a view similar to FIG. 2 showing the cover about to be closed.
Figure 5:
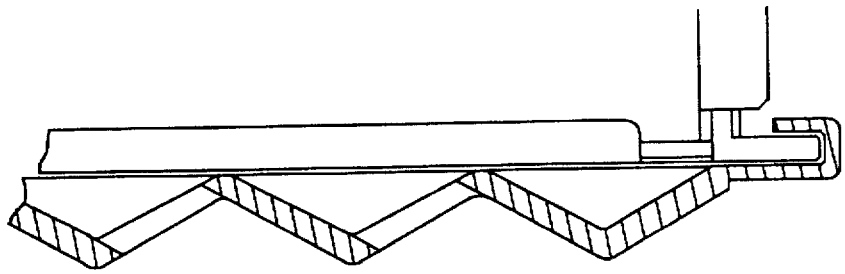
FIG. 5 is an enlarged sectional view taken substantially along the line 5—5 of FIG. 4.
Figure 7:
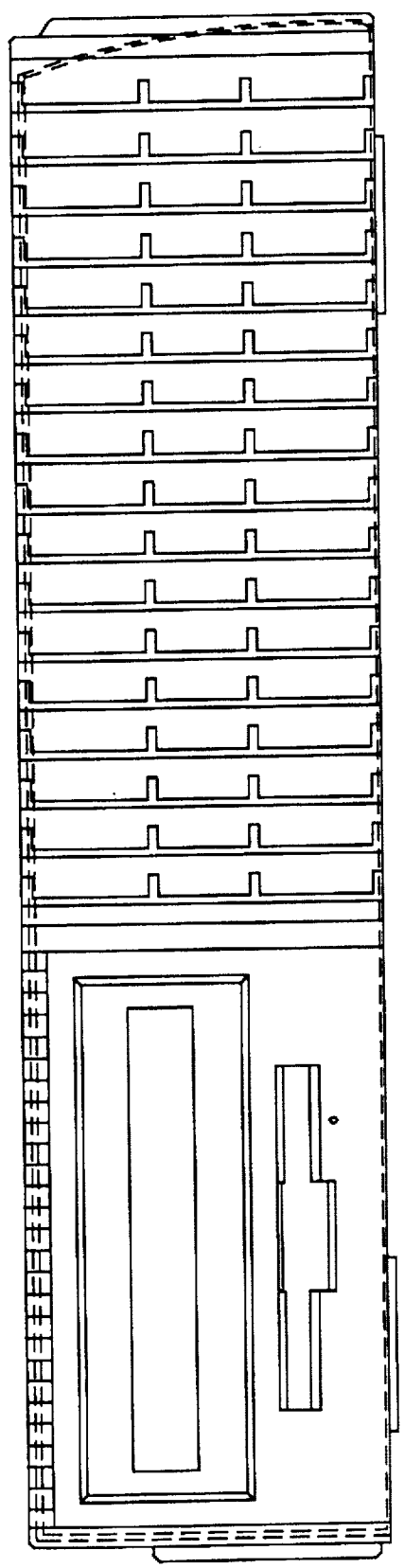
FIG. 7 is a side elevational view showing the cover closed.

As the cover is moved from the position of FIGS. 2 and 3 with the lower edge of front 33 engaging the lower edge of front 23, the cover is initially in an upwardly-rearwardly slanted position and swung downwardly rearwardly as shown in FIGS. 4 and 7, the outward distortable portion 49 clears the projection 46 and no interference occurs.

Flanges 34 are guided in their downward-rearward motion by curved guides 28 and lock therearound to hold the cover accurately in place. Screws (not shown) are used to secure cover 31 in position.

What is claimed is:

1. An enclosure comprising a base comprising a bottom, an upstanding base front, a base rear and first and second upstanding base sides, said first base side being formed with a base opening, a bezel framing said base opening and projecting outward relative to said first base side, said bezel having a bezel opening, a cover comprising a top, a cover front substantially perpendicular to said top and at least one cover side perpendicular to said top, said one cover side being formed with an outwardly distortable portion overlying and spaced outwardly of said bezel, said cover side being formed with a cover opening substantially congruent with said bezel opening, a lower edge of said cover front engaging a lower edge of said base front when said cover slants upward-rearward prior to closing and said outward distortable portion clearing said bezel as said base cover pivots downward rearward to a closed position and then resuming an original undistorted shape.

2. An enclosure according to claim 1 in which said bezel opening comprises a horizontal bezel slit shaped for insertion in and removal of removable media inward of said base opening and a second bezel opening for controls or jacks for said removable media.

3. An enclosure according to claim 2 in which said cover opening comprises a first cover opening substantially congruent to said slit and a second cover opening substantially congruent to said further opening, said first opening being in alignment with said slit and said second opening being in alignment with said further opening in the closed position of said cover.

4. An enclosure according to claim 1 which further comprises a curved vertical guide on a rear edge of said first base side and a flange on a rear edge of said one cover side positioned and shaped to engage and be guided by said guide as said cover pivots to closed position.

5. An enclosure according to claim 4 in which said flange comprises a forward-facing channel shaped to fit around a rear edge of said guide.

\* \* \* \* \*